United States Patent
Wagner et al.

[11] Patent Number: 5,853,230
[45] Date of Patent: Dec. 29, 1998

[54] METHOD AND APPARATUS FOR CONTROLLING THE BRAKE SYSTEM OF A VEHICLE

[75] Inventors: Jochen Wagner; Helmut Wiss, both of Moeglingen, Germany

[73] Assignee: Robert Bosch GmbH, Stuttgart, Germany

[21] Appl. No.: 844,066

[22] Filed: Apr. 18, 1997

[30] Foreign Application Priority Data

Apr. 20, 1996 [DE] Germany ............... 196 15 805.2

[51] Int. Cl.⁶ .................. B60T 8/34; B60T 8/66
[52] U.S. Cl. ........................ 303/113.4; 303/155
[58] Field of Search ............... 303/3, 15, 113.4, 303/115.2, 155, 166, 171; 364/426.026, 426.042; 701/70

[56] References Cited

U.S. PATENT DOCUMENTS

| | | | |
|---|---|---|---|
| 5,261,730 | 11/1993 | Steiner et al. | 303/113.4 |
| 5,281,011 | 1/1994 | Yoshino et al. | 303/113.4 |
| 5,282,675 | 2/1994 | Okubo et al. | 303/108 |
| 5,303,988 | 4/1994 | Okubo | 303/103 |
| 5,332,298 | 7/1994 | Fujioka | 303/113.4 |
| 5,333,944 | 8/1994 | Shirai et al. | 303/113.4 |
| 5,445,444 | 8/1995 | Rump et al. | 303/113.4 |
| 5,535,123 | 7/1996 | Rump et al. | 303/155 |
| 5,564,797 | 10/1996 | Steiner et al. | 303/113.4 |
| 5,668,724 | 9/1997 | Ehret et al. | 303/113.4 |
| 5,669,676 | 9/1997 | Rump et al. | 303/113.4 |
| 5,669,678 | 9/1997 | Stumpe et al. | 303/113.4 |

FOREIGN PATENT DOCUMENTS

| | | |
|---|---|---|
| 0204483 | 5/1986 | European Pat. Off. |
| 4030617 | 1/1991 | Germany. |
| 4114346 | 5/1991 | Germany. |
| 59-20624 | 7/1983 | Japan. |
| 2127505 | 6/1984 | United Kingdom. |

Primary Examiner—Robert J. Oberleitner
Assistant Examiner—Chris Schwartz
Attorney, Agent, or Firm—Fulbright & Jaworski LLP.

[57] ABSTRACT

An operational state of a brake system is determined by detecting operating parameters such as actual vehicle acceleration, state of the brake light switch, vehicle velocity, inlet pressure at the master cylinder, and status of the ABS. A nominal value for vehicle deceleration is then determined based on the operation state of the vehicle. During a control phase, which may be switched on based on the rate of build-up of inlet pressure, the nominal value is determined independently of the magnitude of pedal actuation by the driver.

11 Claims, 5 Drawing Sheets

METHOD AND APPARATUS FOR CONTROLLING THE BRAKE SYSTEM OF A VEHICLE

BACKGROUND OF THE INVENTION

The invention relates to a method and an apparatus for controlling the brake system of a vehicle.

DE 195 26 659, corresponding to which U.S. application Ser. No. 08/663,677 discloses a method and an apparatus for controlling the brake system of a vehicle, in which the braking force at the wheels is actively controlled during a braking event according to the operation of the brake pedal by the driver. For the control of the brake system the deceleration of the vehicle is controlled in a deceleration governing circuit at least in accord with the actuating signal. The prior-art system for governing deceleration is active only in the event of so-called panic stop in which the driver depresses the brake pedal very far and very quickly in order to stop the vehicle with its maximum braking power in a dangerous situation. If such panic braking occurs, an event which is learned at least from the brake pedal actuation signal, braking power is applied independently of the driver by the appropriate brake system control, and control of the vehicle's brake is taken away from the driver. The driver has thus completely lost his influence on the braking of the vehicle in this situation.

It is an object of the invention to provide measures whereby the driver will be allowed to control the braking of the vehicle even in situations of this kind.

SUMMARY OF THE INVENTION

According to the invention, the brake system is controlled according to one of a regulation phase or a control phase dependent upon the operation state of the brake system. A nominal value for vehicle deceleration is determined based on the magnitude of pedal actuation by the driver during the regulation phase, and independently of the pedal actuation during the control phase. Braking force at the wheels is then controlled so that the actual vehicle deceleration approaches the nominal vehicle deceleration.

The invention makes it possible for the driver at all times to influence the automatic increase of the brake force.

It is especially advantageous that the driver can at any time turn off the automatic braking or switch the automatic increase of the braking force to a decelerating action based on the driver bracking command.

It is especially advantageous that the braking force is adjusted according to the driver's wish in the regulation phase of the braking control system, while in the control phase the automatic augmentation of the braking force continues to be out of the control of the driver.

It is especially advantageous that, with the invention, the advantageous effects of automatic braking force enhancement are retained, but the braking is not entirely removed from the driver's control. Comfort and security of the vehicle are thus enhanced.

BRIEF DESCRIPTION OF THE EMBODIMENTS

Figure 1:
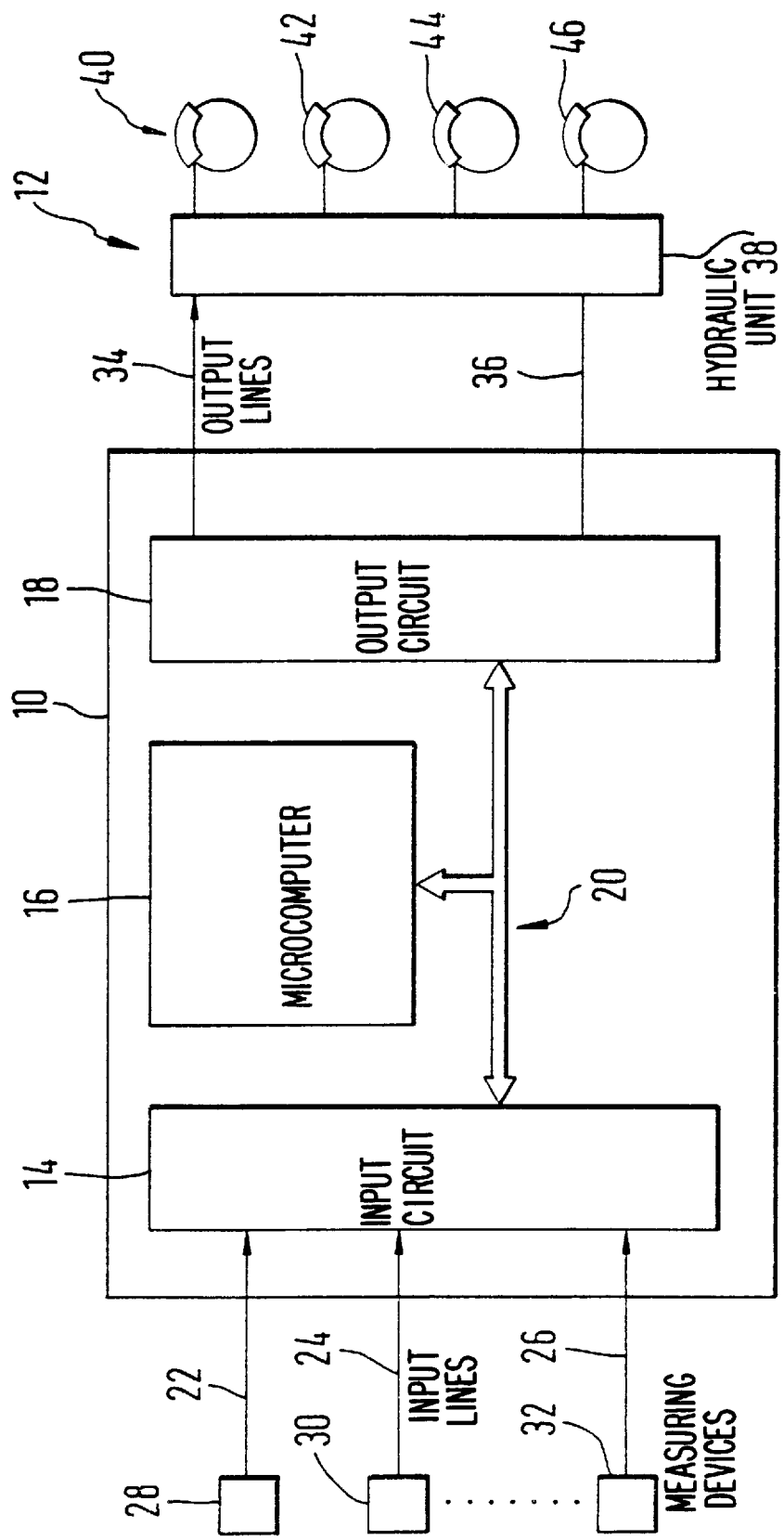
FIG. 1 shows a control system for controlling the brakes of a vehicle.

FIG. 1 shows a control system 10 for controlling the brake system 2 of a vehicle. The control unit 10 comprises an input circuit 14, at least one microcomputer 16, and an output circuit 18, the input circuit, microcomputer and output circuit being connected together. At least the input lines 22 and 24–26 run to the input circuit 14 of the control unit 10. In one preferred embodiment, these are combined in a bus system (e.g., CAN). The input line 22 comes from at least one measuring device 28 for detecting actuation of the brake pedal. The measuring device 28 can be a length-of-movement sensor, a pressure sensor or detecting a pressure produced by the driver in the brake system, or a force sensor for detecting the force applied to the pedal. The input lines 24–26 are connected to measuring devices 30–32, by which additional data from the brake system, the vehicle and/or its drive unit such as for example wheel speeds, dynamic road data, engine rpm, engine load, etc. are fed, which are used for the control of the brake system. The control unit 10 controls the brake system 12 of the vehicle through the output lines 34–36 connected to the output circuit 18. In the preferred embodiment, the brake system is a hydraulic brake system which has a hydraulic unit 38 with controllable valve arrangements and pumps, which are controlled through output lines 34–36 for applying pressure, removing pressure or keeping pressure constant. The individual wheel brakes 40, 42, 44 and 46 are connected to the hydraulic unit 38.

The control unit 10, and the microcomputer 16 therein, detects through the input line 22 a signal indicating that the brake pedal has been depressed. This signal is evaluated as to whether a panic braking situation is involved. In the preferred embodiment the signal represents the pressure applied by the driver to the master brake cylinder of a hydraulic brake system, the so-called inlet pressure. If this inlet pressure exceeds a given limit and if its gradient is greater than a gradient threshold, a panic stop is assumed and, by activating the valve and pump system, brake pressure is applied independently of the driver. The brake pressure is increased until the break-away limit between tire and road is reached. This is accomplished by presetting a targeted or nominal rate of deceleration of the vehicle, which in the above-described control phase is set at a maximum value. This nominal deceleration rate is converted to a brake torque for the wheel brakes by a deceleration controller which brings the actual deceleration close to the nominal value, in accordance with which the brake pressure is applied to the wheel brakes.

According to the invention, the preset vehicle deceleration rate differs according to the state of operation of the vehicle. In the control phase described above, panic braking is involved, so that the nominal deceleration rate is set at the maximum level and thus a maximum friction is achieved between the tires and the road surface. If during this control phase the driver releases the pedal slightly, the system is switched to the so-called "regulating phase," in which the targeted deceleration is made to depend on the amount of force applied to the brake pedal. If the driver substantially releases the brake pedal, then both the control phase and the regulating phase are shut off. Thus the driver is able, even after initiating panic braking, to influence the deceleration of the vehicle.

Figure 2:
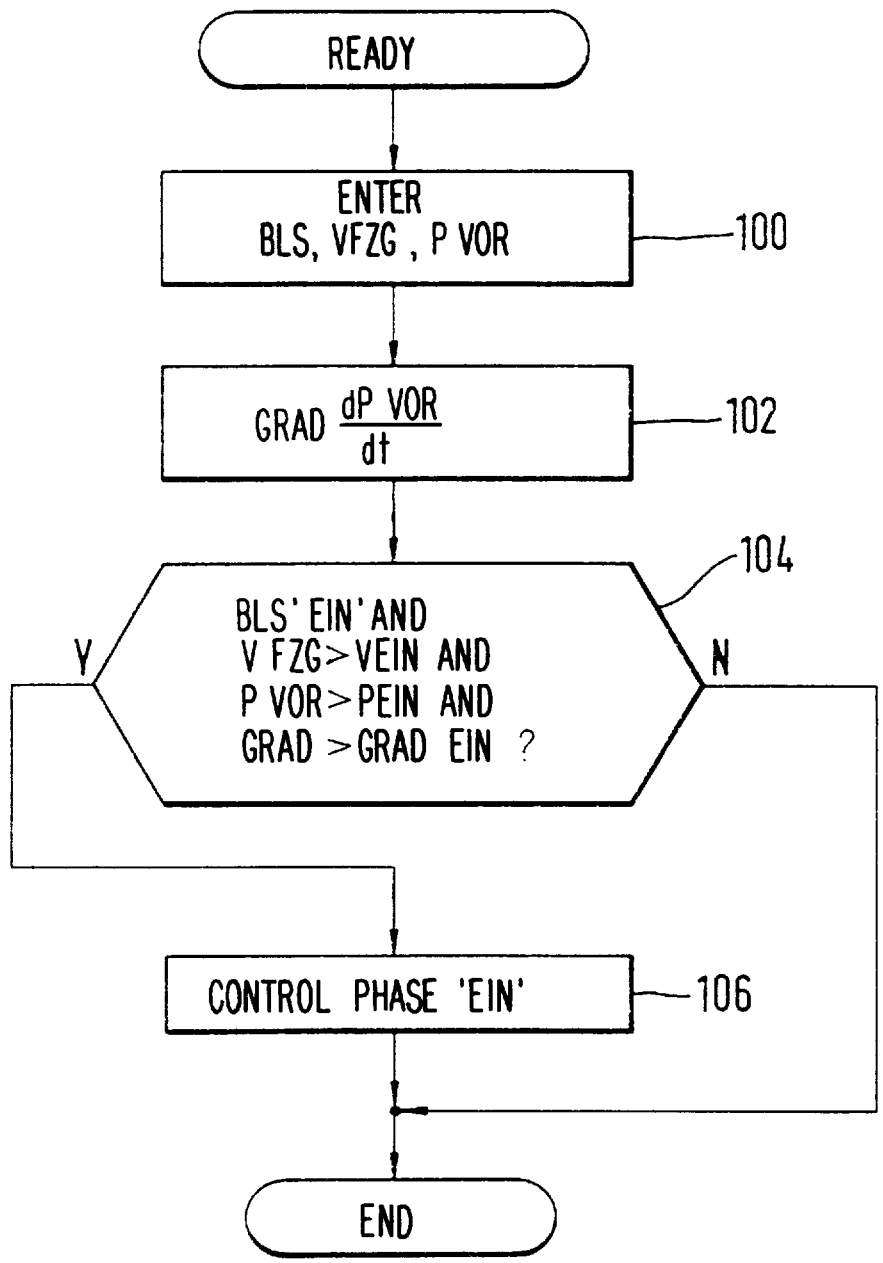
FIG. 2 describes the "ready" phase of the program.
Figure 3:
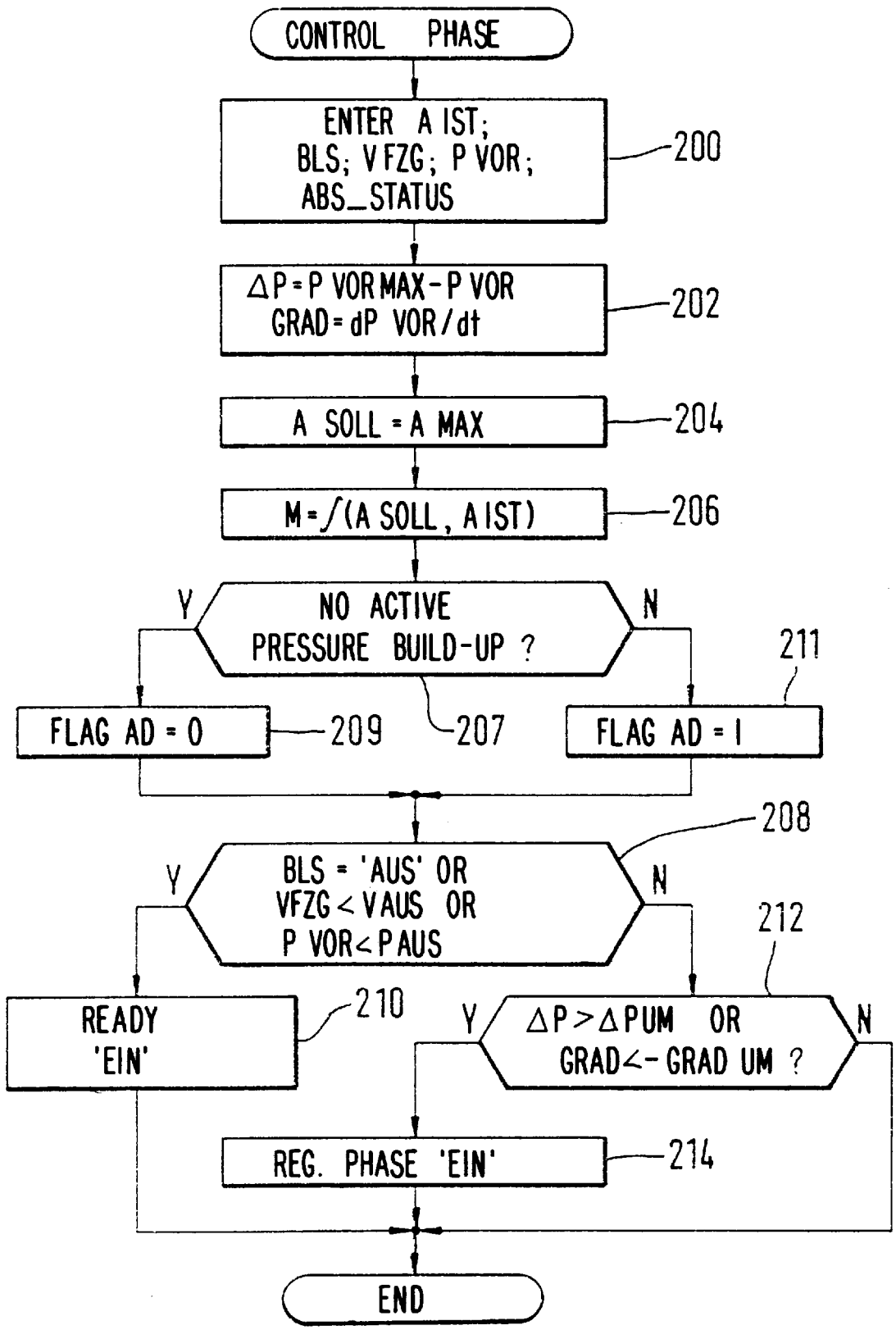
FIG. 3 describes the control phase.
Figure 4:
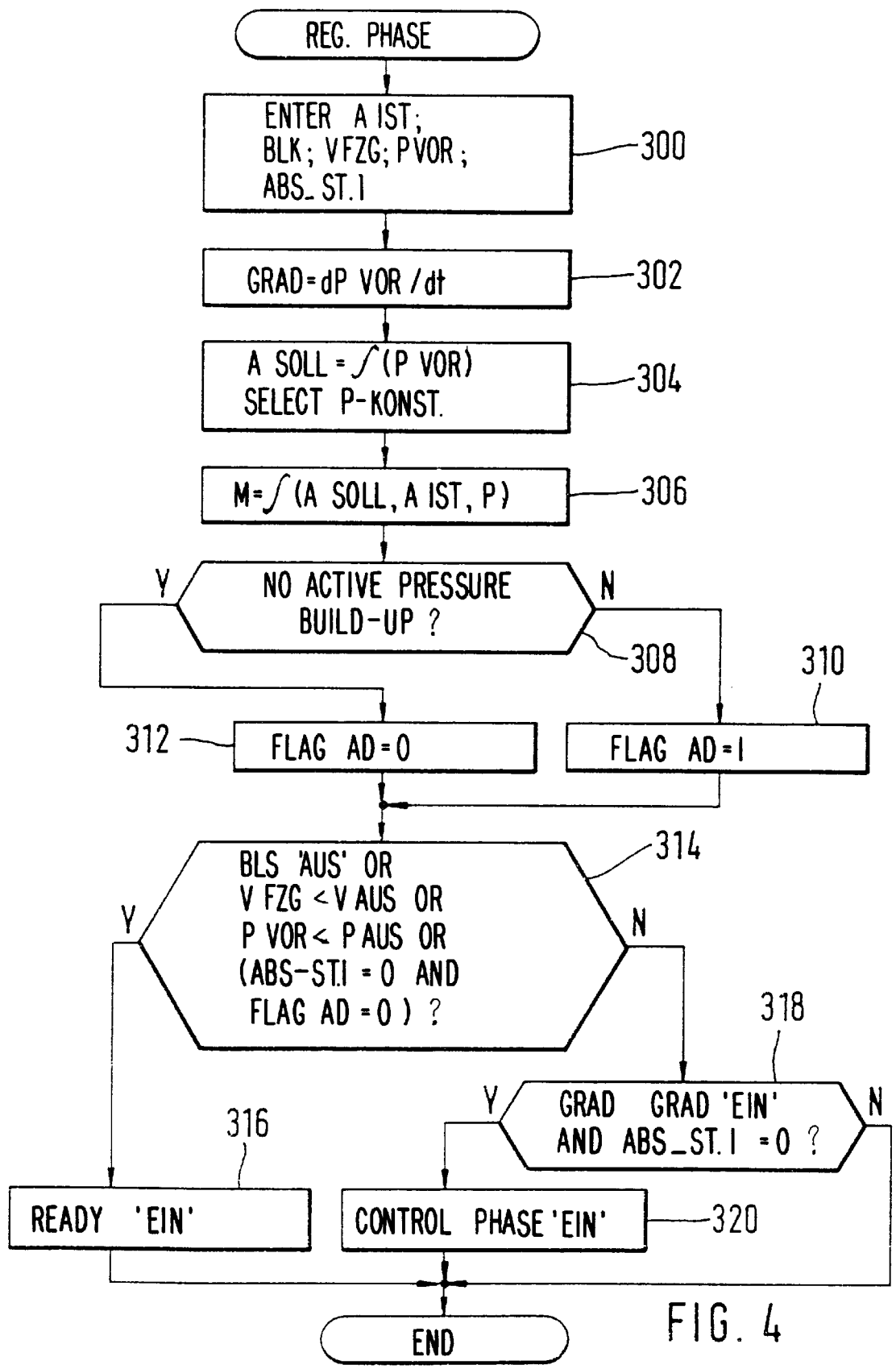
FIG. 4 describes the regulation phase.

A preferred embodiment of the control of a brake system according to the invention is shown in the flow diagrams of FIGS. 2 to 4, representing programs which are implemented in the microcomputer 16 of the control unit 10.

In the preferred embodiment, three working states (3 phases) of the brake force control (intensification) are provided: the ready phase, the control phase and the regulation phase. Basically the control is in the ready phase (cf. FIG. 2). In this phase initial conditions are checked. If they are satisfied the system shifts to the control phase (cf. FIG. 3). In this control phase the maximum stopping friction between tires and pavement is reached by increasing the brake force independently of the driver by a corresponding input of a targeted deceleration rate. Also checked are the switch-over and switch-off conditions. If switch-off conditions are present the system returns to the ready phase. If the switch-over conditions are satisfied the regulation phase (cf. FIG. 4) is started. There the brake force at the wheel brakes is controlled in proportion to the driver's input, and switch-back and switch-off conditions are checked. Here, again, the system will return to the ready phase if the switch-off conditions are satisfied, but if the switch-back conditions are satisfied the control phase is restarted.

In a preferred embodiment, the said conditions are as follows: Switch-on condition: Brake light switch on, speed above turn-on threshold, inlet pressure greater than the triggering threshold.

Switch-over condition: Inlet pressure reduction above the switch-over threshold or inlet pressure gradient lower than the switch-over gradient.

Switch-back condition: Inlet pressure gradient greater than the triggering threshold and all wheels not under ABS control.

Switch-off condition: Brake light switch off, or speed lower than the switch-off speed or inlet pressure lower than switch-off pressure. An additional or connected condition is that no wheel is under ABS control and no active pressure build-up occurs.

The said conditions have proven suitable in one application. In other cases of the application of the solution offered by the invention, these conditions can also be modified. Also, instead of detecting the inlet pressure, provision is made in other embodiments to detect the force applied to the accelerator pedal of the amount the accelerator pedal is depressed and evaluate accordingly.

In addition to use in connection with hydraulic brake systems, the use of the invention in air-brakes or electro-motorized braking systems is advantageous.

A preferred embodiment is represented in the flow diagrams of FIGS. 2 to 4.

The flow diagram of FIG. 2 describes the "ready" phase. The part of the program there described is initiated at given time intervals, e.g., a few milliseconds. In the first step 100, the brake light switch signal BLS, the vehicle speed VEL and the inlet pressure P INLET are entered. In the next step 102 the gradient of the inlet pressure GRAD is formed from the time derivative of the inlet pressure signal or from the difference detected between two inlet pressure values in different program performances. In the next interrogation step 104 the conditions concerning the activation of the brake control are checked. This means that a check is made in a logical AND circuit whether the brake light switch has been closed, the inlet pressure exceeds the switch-on threshold P ON, and the gradient exceeds the triggering threshold GRAD ON. If this is not the case, the program section is ended and at the next time it is repeated. If the conditions are all satisfied, then in step 106 the so-called control phase is initiated.

This phase is sketched in the flow diagram in FIG. 3. The program section represented is initiated, when the control phase is active, at given time intervals. In the first step 200, the actual deceleration of the vehicle DACT, and the inlet pressure P INLET as well as a status bit which indicates that the wheel in question is under ABS action, are entered. In the next step 202 the difference ΔP is computed from the maximum inlet pressure and the actual inlet pressure, as well as the gradient GRAD of the inlet pressure (cf. FIG. 2). Then, in step 204, the nominal deceleration value D NOM is set to a maximum A MAX dependent upon operational factors (e.g., dependent on vehicle speed) and in the next step 206 the braking moment M is computed on the basis of a deceleration adjustment in relation to the deceleration value D NOM and the actual deceleration value DACT. The controller used in that case has a PID characteristic in the preferred embodiment. In other embodiments other control strategies can be used. The braking moment to be established is then converted to brake pressure values from which actuating signals for the pump and valve systems are formed, if desired. If the braking moment is produced by operating the pump and valve system at a pressure exceeding the driver's pressure (active pressure build-up) a flag is set to the value 0, or in the opposite case the value 1. This is represented in steps 207, 209 and 211. If no active pressure build-up takes place (step 207) the flag AD is set to 1 (stop 209), otherwise to 0 (step 211). In the following interrogation step 208 the conditions for switching off the control phase are checked. The control phase is shut off if the brake pedal switch is off, the vehicle speed drops below a switch-off threshold V OFF or the forepressure P INLET drops below a switch-off pressure P OFF. If any of these conditions are satisfied, then in step 210 the ready phase is activated and with it the program section represented in FIG. 2; otherwise in step 212 the so-called "switch-over" conditions are checked. In step 212 a check is made to see whether the forepressure reduction ΔP, which was determined in step 202, is greater than a switch-over value P SWITCH or the gradient is less than a negative switch-over gradient GRAD SWITCH. If any of the conditions are satisfied, then in step 214 the regulation phase according to FIG. 4 is initiated; otherwise the program section for the rule phase is initiated again at the next point in time.

The switch-on and -off thresholds are different in one preferred embodiment, wherein the switch-off thresholds are lower than the switch-on thresholds. In another embodiment both are equal.

The switch-over from the control phase to the regulation phase takes place whenever the driver eases off his pressure on the brake pedal at a given rate or lowers the inlet pressure PFAHRER by a given amount, by backing off the pedal by a corresponding amount. The switch-over threshold P SWITCH can be determined as a function of the inlet pressure (max. inlet pressure) (SWITCH=K1+PFOR max/ K2 K1, K2 constants).

When the regulation phase is active the program section of FIG. 4 is activated at given time intervals. In the first step 300 of this program section the vehicle deceleration DACT, the brake pedal situation BLS, the vehicle speed VEL, the inlet pressure P INLET and the information on the ABS status of the wheels. In the next step 302 the inlet pressure gradient GRAD is determined, and in the next step 304 the nominal deceleration DACT is read out of the measured inlet pressure according to a given characteristic. The connection between inlet pressure or $P_{DRIVER}$ and the nominal deceleration is preferably proportional, the proportional constant being selected according to the operational factors, such as inlet pressure, or the actual deceleration. After step 304, the brake moment to be established is determined according to the deceleration regulator based on the nominal deceleration and the actual deceleration. In the next interrogation section

308, the query is made whether this brake moment is produced by an active pressure build-up. If this is the case the corresponding flag is set in step 310 to 1, otherwise it is set in step 312 to 0. Thereupon in the interrogation step 314, the switch-off conditions discussed in FIG. 3 in connection with step 208 are examined, to which is added the condition that no wheel is in ABS (ABS status=0 for all wheels) and the flag for the active pressure build-up is also 0. i.e., no active pressure build-up takes place. If any of the switch-off conditions is satisfied, then in step 316 the "ready" phase is entered. If none of the switch-off conditions is satisfied, then in step 318 the conditions for switching back to the control phase are checked. To this end the gradient of the inlet pressure is compared with the switch-on gradient threshold GRAD1 and it is determined whether any ABS control is taking place on at least one wheel. If both these conditions are satisfied, the system is switched back in step 220 into the control phase; otherwise the program section is terminated and repeated at the appropriate time.

The switch back from the rule phase, in which the driver sets the deceleration, to the control phase in which automatic deceleration is applied is thus performed whenever at least one wheel is not in active ABS control and the driver again rapidly depresses the brake pedal.

Figure 5A:
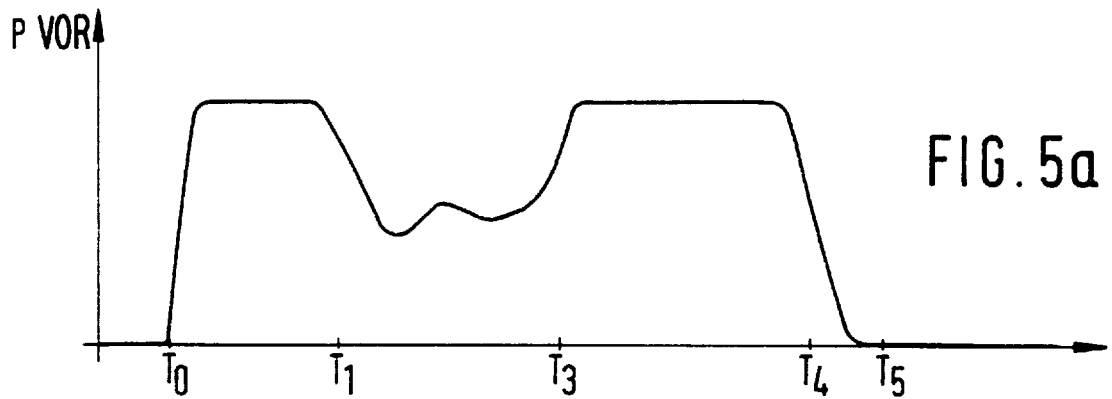
FIG. 5 presents time curves for a number of signals in the use of the invention.
Figure 5B:
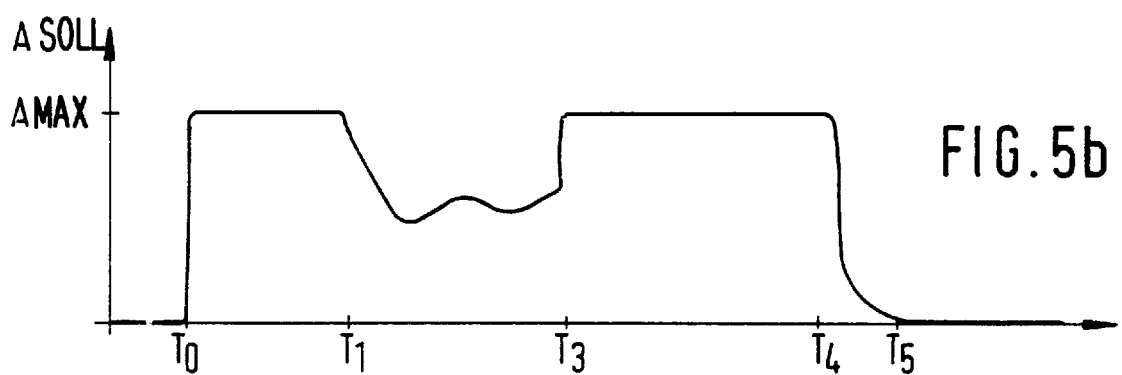
Figure 5C:
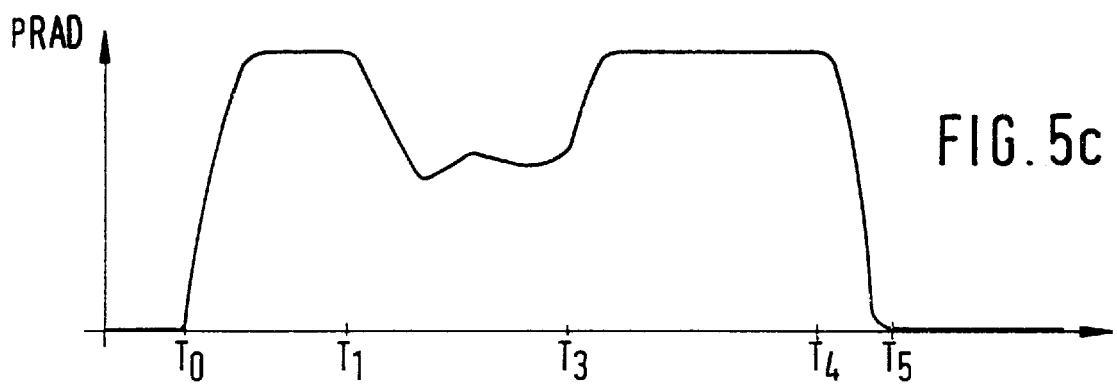

Typical signal sequences in a chosen operational situation in which the invention is used are illustrated in FIG. 5. FIG. 5*a* shows the time curve of the inlet pressure, FIG. 5*b* the time curve of the "soll " deceleration, and FIG. 5*c* the time curve of the brake pressure in a wheel brake.

At the time $T_0$ the driver suddenly steps on the brake pedal very rapidly so that, assuming the other conditions to be satisfied, the inlet pressure and inlet pressure gradient exceed the set thresholds. This means that, at moment $T_0$ or immediately thereafter, the target deceleration value is set at a maximum value AMAX. Up to the time $T_1$ the driver does not vary the pedal position, so that from time $T_0$ to time $T_1$ brake pressure is built up very rapidly in the wheel brake cylinders in order to maintain the preset nominal deceleration. At the moment $T_1$ the driver slightly backs off his pressure on the brake pedal. The inlet pressure curve is assumed to be such that the switch-over conditions are satisfied. Thus, beginning at moment $T_1$ a switch-over is made from the control to the rule phase. Between moment $T_1$ and moment $T_3$ the driver slightly varies the pedal position so that a nominal deceleration curve and with it a corresponding pressure curve is noted. At moment $T_3$ the driver again presses the pedal very rapidly, so that the switch-back condition is satisfied. Therefore at time $T_3$ or immediately thereafter, the target deceleration AMAX is re-established, the brake pressure is increased accordingly, and is maintained up to time $T_4$. At time $T_4$ the driver releases the brake pedal, so that one of the switch-off conditions is fulfilled. The braking action is therefore shut off, the ready phase turned on, and the brake pressure is reduced to 0 by time $T_5$.

In an advantageous embodiment, the rule phase is active throughout the entire braking action, but the rule phase is active only in the event of panic braking. The ready phase is then continued outside of braking actions or at the beginning thereof.

We claim:

1. A method for controlling a brake system of a vehicle, said system comprising a brake pedal actuated by a driver, said method comprising determining a magnitude representing pedal actuation by the driver, determining based at least on the magnitude of pedal actuation whether of the brake system, the brake system is to be controlled according to a control phase or a regulation phase, determining a nominal value for vehicle deceleration, said nominal value being determined according to a predetermined value when the brake system is to be controlled according to said control phase, said nominal value for vehicle deceleration being based on the magnitude of pedal actuation when the brake system is to be controlled according to said regulation phase, determining actual vehicle deceleration, and controlling said brake system so that the actual vehicle deceleration tends toward said nominal vehicle deceleration.

2. The method according to claim 1 wherein when the brake system is controlled according to the control phase the nominal deceleration value is set at a maximum value.

3. The method according to claim 1 wherein a switch-over from control of the brake system according to the control phase to control according to the regulation phase is made whenever the driver slightly backs off the pedal or the backing off speed exceeds a certain threshold value.

4. The method according to claim 1 wherein when the brake system is controlled according to the regulation phase the nominal deceleration value is formed independently of the brake pedal actuation by the driver.

5. The method according to claim 1 wherein the brake force at the wheel brakes is controlled according to a circuit governing the actual vehicle deceleration.

6. A method for controlling a brake system of a vehicle, said system comprising a brake pedal actuated by a driver, said method comprising determining a magnitude representing pedal actuation by the driver, determining an operational state of the brake system, controlling the brake system according to one of a control phase or a regulation phase in dependence upon the operational state of the brake system, determining a nominal value for vehicle deceleration, said nominal value being determined independently of the magnitude of pedal actuation during said control phase, said nominal value for vehicle deceleration being based on the magnitude of pedal actuation during said regulation phase, and controlling said brake system so that an actual vehicle deceleration conforms to said nominal vehicle deceleration, and wherein with the control phase inactive, and the regulation phase inactive, a ready phase is provided, in which the operational state of the brake system is monitored for the conditions for switching-on the control phase.

7. The method according to claim 6 herein the control phase is switched on whenever the actuation of the brake pedal exceeds a certain distance and the time gradient of brake pedal actuation exceeds a certain threshold.

8. The method according to claim 7 wherein the control phase is switched on on the further conditions that a brake pedal switch is closed and the vehicle velocity exceeds a threshold velocity.

9. A method for controlling a brake system of a vehicle, said system comprising a brake pedal actuated by a driver, said method comprising determining a magnitude representing pedal actuation by the driver, determining an operational state of the brake system, controlling the brake system according to one of a control phase or a regulation phase in dependence upon the operational state of the brake system, determining a nominal value for vehicle deceleration, said nominal value being determined independently of the magnitude of pedal actuation during said control phase, said nominal value for vehicle deceleration being based on the magnitude of pedal actuation during said regulation phase, and controlling said brake system so that an actual vehicle deceleration conforms to said nominal vehicle deceleration, and wherein a changeover of control of the brake system from control according to the regulation phase to control according to the control phase is made if the gradient of the brake pedal actuation is greater than a triggering threshold and no ABS control takes place at least one wheel.

10. A method for controlling a brake system of a vehicle, said system comprising a brake pedal actuated by a driver, said method comprising determining a magnitude representing pedal actuation by the driver, determining an operational state of the brake system, controlling the brake system according to one of a control phase or a regulation phase in dependence upon the operational state of the brake system, determining a nominal value for vehicle deceleration, said nominal value being determined independently of the magnitude of pedal actuation during said control phase, said nominal value for vehicle deceleration being based on the magnitude of pedal actuation during said regulation phase, and controlling said brake system so that an actual vehicle deceleration conforms to said nominal vehicle deceleration, and wherein a changeover of control of the brake system from control according to the control phase or regulation phase is made to control according to the ready phase and the brake control is switched off, responsive to a determination that the actuation degree is below a switch-off threshold, the velocity is less than a switch-off velocity, the brake pedal switch is open, or when in the regulation phase no wheel is under ABS action and no active pressure build-up takes place.

11. Apparatus for controlling a brake system of a vehicle, said system comprising a brake pedal actuated by a driver, said apparatus comprising means for determining a magnitude representing the pedal actuation by the driver, means for determining based at least on the magnitude of pedal actuation, whether the brake system is to be controlled according to a control phase or a regulation phase, means for determining a nominal value for vehicle deceleration, said nominal value being determined according to a predetermined value when the brake system is to be controlled according to said control phase, and said nominal value for vehicle deceleration being determined based on the magnitude of pedal actuation when the brake system is to be controlled according to said regulation phase, means for determining the actual vehicle deceleration, and means for controlling said brake system and causing the actual vehicle deceleration to tend toward said nominal vehicle deceleration.

* * * * *